United States Patent [19]

Deckert et al.

[11] 3,874,129

[45] Apr. 1, 1975

[54] PROCESS FOR THE PRODUCTION OF HAZE-FREE SEMICONDUCTOR SURFACES

[75] Inventors: Helmut Deckert, Burghausen; Wolfgang Heinke, Od (Post Mehring); Herbert Jacob; Helmut Kirschner, both of Burghausen, all of Germany

[73] Assignee: Wacker-Chemitronic, Postfach, Germany

[22] Filed: Sept. 25, 1973

[21] Appl. No.: 400,576

[30] Foreign Application Priority Data

Sept. 26, 1972 Germany ............................ 2247067

[52] U.S. Cl. ......................... 51/283, 51/308, 51/326

[51] Int. Cl. ............................................. B24b 1/00

[58] Field of Search ............. 51/308, 309, 281, 307, 51/283, 284, 318, 326

[56] References Cited

UNITED STATES PATENTS 2,375,823 5/1945 Saunders ............................... 51/308
2,375,824 5/1945 Saunders ............................... 51/308
2,375,825 5/1945 Saunders ............................... 51/308
2,427,799 9/1947 Maloney ............................... 51/308
3,170,273 2/1965 Walsh et al. ............................ 51/308
3,715,842 2/1973 Tredinnick et al. ..................... 51/308

*Primary Examiner*—Donald J. Arnold
*Attorney, Agent, or Firm*—Allison C. Collard

[57] ABSTRACT

Producing semiconductors with exceptionally smooth haze-free surfaces in a multistage polishing process wherein polishing the semiconductor with a first and conventional polishing agent containing a silicon compound suspended in water is followed by polishing with a modified polishing agent comprising said first polishing agent in major proportion containing minor but effective additions of polyvinyl alcohol and a 3 to 5 carbon monohydroxy aliphatic alcohol.

1 Claim, No Drawings

PROCESS FOR THE PRODUCTION OF HAZE-FREE SEMICONDUCTOR SURFACES

The state of the art includes knowledge of how to treat semiconductor surfaces with polishing agents containing quartz, silicic acid, silicates and fluosilicates (also known as fluorosilicates and fluorsilicates) which may also contain alkali, for chemical polishing, in order to obtain smooth surfaces. These smooth surfaces are necessary for semiconductors that are to be used as components or starting materials for the production of electronic parts, e.g., integrated circuits.

Interference with the crystal structure of the semiconductor surfaces caused, e.g., by prior mechanical working of the crystal (scratches, damage through sawing, deep damage through lapping) impairs the yield of electronic construction elements. To test the surfaces, the following test procedures are used in the electronic industry. The surfaces of the discs are inspected in a dark roon under a beam of narrowly bunched strong rays of light. Irregularities and interruptions in the crystal surface, also even specks of dirt and residues of earlier washing processes, can be recognized quicker and better by means of the diffusion of incident light than when studied under a microscope.

In the polishing methods known up until now, the aforementioned defects were indeed removed, but the surfaces showed the point of impact or incidence of the light beam as a milky surface. This diffustion of light occurs at the slightly roughened semiconductor surface. It is true that the roughening cannot be seen with the naked eye, but it causes the diffusion or scattering of the spot light beams. This phenomenon is now known as "haze."

It is therefore an object of the present invention to provide a polishing method which produces haze-free surfaces and thus further improves the quality of the semiconductor surfaces. This object of the invention is a method for the production of haze-free semiconductor surfaces through polishing with polishing agents that contain quartz, silicic acid, silicates and/or fluosilicates, characterized in that a first polishing step in which a polishing agent is used which, in addition to one of the above-mentioned components of the polishing agents or mixtures thereof, contains 1 – 10 percent by volume, calculated on the volume of the first polishing agent, of a monohydroxy alcohol with from 3 to 5 carbon atoms and 0.01 – 0.5 percent by weight of polyvinyl alcohol, calculated on the weight of the first polishing agent.

Surprisingly, it was found that through the additives in the second polishing step, the roughness in the surface can be eliminated so that the semiconductor surface does not cause any diffusion of the light beam. The surfaces are haze-free (optically smooth), and the yield of electronic semiconductor elements that are made of such polished semiconductor material is no longer reduced by faulty surface quality.

Known polishing suspensions are used for the first polishing step. They may desirably contain precipitated silicates or fluosilicates as described in the German Public Disclosure No. 1,752,163. Examples of such silicates are the silicates of the metals of the 2nd and 3rd main and subordinate groups of the periodic system, and silicates of heavy metals as for instance, zirconium, iron, lead, nickel, cobalt, magnesium, calcium, strontium, barium, zinc and aluminum. Examples of fluosilicates are fluosilicates of the metals of the 1st, 2nd 3rd groups of the periodic system, e.g., sodium, potassium, magnesium, calcium, barium, aluminum and zinc. Also silicic acid gels or sols as, e.g., those described in the U.S. Pat. No. 3,170,273, are suitable as polishing agents. Quartz powder, for instance of 5–200 millemicrons grain size, (German Public Disclosure No. 1,219,764) can also be used. The polishing agent usually also contains an alkali as a chemically active component.

The modified polishing agent used for the second polishing step preferably contains either the same components as that for the first step, or any one of the before mentioned group or mixtures thereof. However, in any case it contains additionally about 1 to 10 percent by volume of a monohydroxy (monovalent) alcohol of 3 to 5 carbon atom content, and about 0.01 to 0.5 percent by weight of polyvinyl alcohol. The percentages are calculated on the volume and weight respectively, of the polishing agent without additives, i.e., prior to incorporating these alcohols.

Most of the suitable monohydroxy alcohols are saturated alcohols, e.g., propyl-, isopropyl-, n-butyl-, isobutyl-, tert. butyl-, amyl- and isomayl alcohol. Mixtures of any of these alcohols may also be used.

A polyvinyl alcohol additive containing a major proportion of polyvinyl alcohol, e.g., about 88 to 100 mole% saponified polyvinyl ester is typically employed. Copolymers of vinyl esters, e.g., with ethylene, which subsequently are saponified, may also be used.

The time for the first polishing step, as is known in the industry, amount to about 10 minutes to 2 hours. The polishing in the second step usually takes only about 2 to 10 minutes.

The method according to the invention may be used in the polishing of semiconductor materials in general, including the most dissimilar of them, e.g., silicon, germanium, III-V semiconductors, e.g., gallium arsenide. The semiconductor bodies that are to be polished are often present in the form of discs. Still other examples of such semiconductors include gallium phosphide and indium antimonide.

EXAMPLE 1

Round silicon discs of 50 mm. diameter and 350 micron thickness, which have been produced by sawing off sections of a monocrystalline silicon rod, are fastened by means of wax on a round, flat carrier plate of stainless steel. This plate is placed on a polishing machine turntable which is covered with a polishing cloth with the silicon discs in contact with that cloth and subjected to a pressure of 0.2 kp./cm$^2$. with the turntable rotating at 90 rpm. A polishing suspension consisting of 50 l. water glass (30% $SiO_2$) and 25 kg. calcium chloride ($CaCl_2.6H_2O$) in 600 l. water, is dripped onto the turntable at the rate of about 25 cc./min. After polishing for about 1 hour, the surface of the silocon disc is polished to a normal extent. However, upon looking at the silicon surface under a spotlight, a milky haze can be seen, which is caused by diffusion of the light. The disc are again placed on the polishing machine, and the polishing process continued for 6 minutes with a new polishing composition, namely a mixture of 100 parts by volume of the first suspension to which have been added 5 parts by volume of n-butyl alcohol and 1 part by volume of a solution of 10 percent by weight solution of polyvinyl alcohol in water. When the disc is inspected again after this process step it is observed that the surface is free from all diffused light, i,e., the location of the spotlight beam reflected by the surface of the disc cannot be identified.

EXAMPLE 2

(Comparative)

More of the silicon discs are subjected to the first polishing step according to Example 1 with the same polishing suspension. The polishing time in this instance is 1 hour and 20 minutes. Thereafter a milky haze on the discs is seen under a spotlight. This means that a prolongation of the polishing time will not eliminate the roughness of the semiconductor surfaces.

EXAMPLE 3

Round gallium arsenide discs of 30 mm. diameter are subjected to the same two-stage polishing process as that described in Example 1. These discs also display a milky haze under the beam of a spotlight after the initial polishing step but not after the second polishing step with additives, according to the present invention.

EXAMPLE 4

A quantity of 50 kg. of powered quartz with a grain size between 0.01 and 0.04 micron is stirred into 500 l. of water and caustic soda is added until the pH valve amounts to between 9.5 and 10.5. The resulting suspension is used to polish round silicon discs of 60 mm. diameter on the device described in Example 1. The quantity dripped on per minute is 30 cc. After 50 minutes, the polishing is interrupted; then to 100 parts by volume of the polishing suspension are added 4 parts by volume of isobutanol and 3 parts by volume of a 10 percent by weight polyvinyl alcohol solution in water. Polishing is then continued for 7 minutes. A test of the disc under the light beam shows that the discs have been polished until they are haze-free.

While the process of the present invention has been described mainly in respect to only a few specific examples for purposes of a complete and detailed disclosure, it will be readily apparent to those skilled in the art that many other embodiments and modifications are within the purview of this invention. Accordingly, the instance invention should not be contrued as limited in any particulars except as recited in the appended claims or required by the prior art.

What is claimed is:

1. In a process for the production of a semiconductor having a haze-free polished surface by polishing the semiconductor with a polishing agent containing a substance selected from the group consisting of quarts, a silicic acid gels or sols, a silicate, a fluosilicate, and mixtures thereof, said substance having a particle size between about 5 and about 200 m$\mu$ the improvement which comprises further polishing the semiconductor in a second polishing step with a modified polishing agent containing said first polishing agent and from about 0.01 percent to about 0.5 percent by weight of polyvinyl alcohol calculated on the weight of said first polishing agent, and from about 1 percent to about 10 percent by volume of a saturated monohydroxy alcohol having from 3 to 5 carbon atoms, based on the volume content on said first polishing agent.

* * * * *